May 25, 1926.
C. GIRL
AUTOMOBILE BUMPER
Filed August 30, 1922
1,585,973
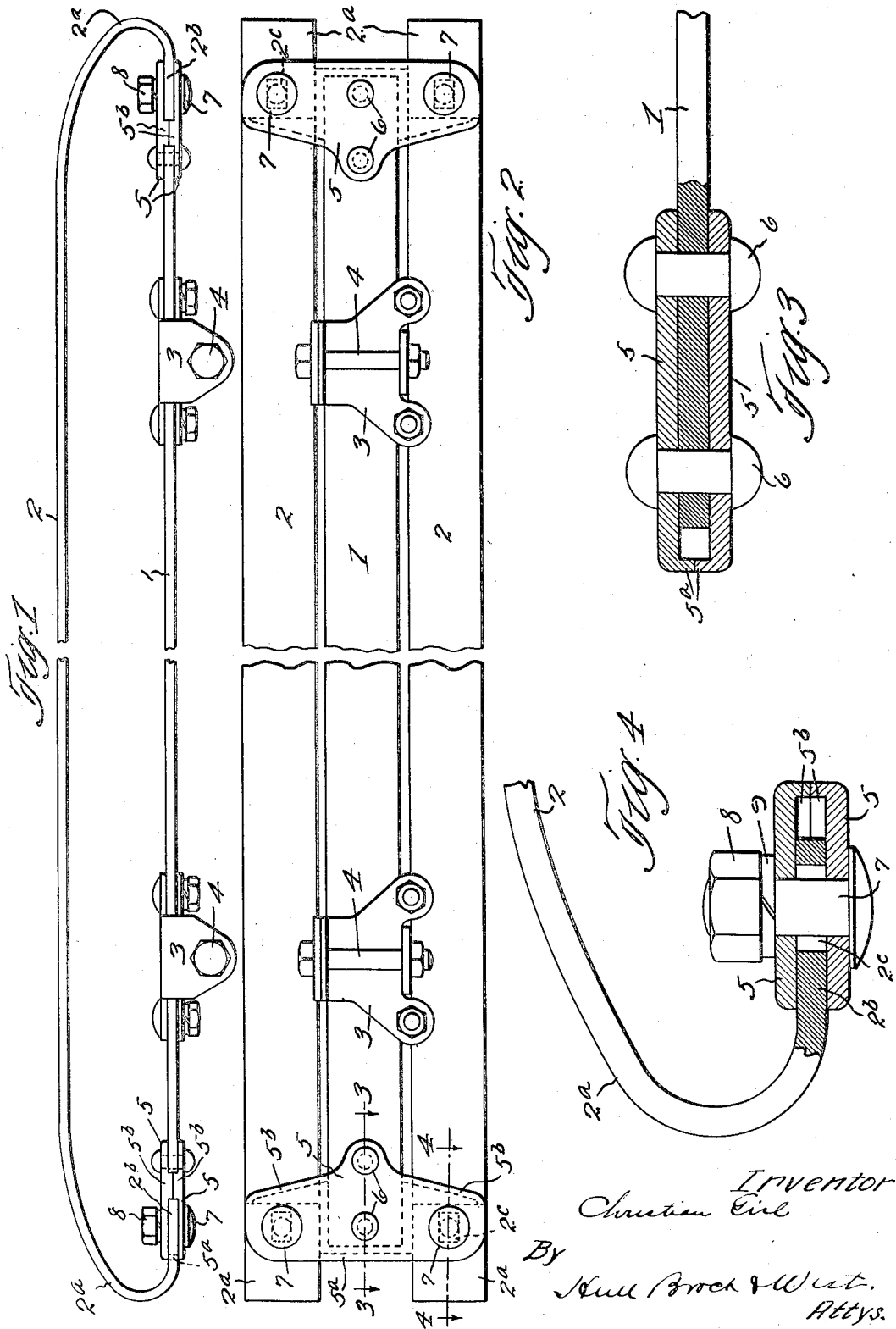

Patented May 25, 1926.

1,585,973

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed August 30, 1922. Serial No. 585,172.

This invention relates generally to automobile bumpers, and has for its object to provide a bumper consisting of a few parts, of simple construction, easily connected together and constituting a bumper of attractive appearance which possesses strength and durability and which is capable of functioning in an efficient manner for the purpose of protecting the vehicle to which it is attached.

Another object is to provide a bumper which is not only easy to manufacture but also inexpensive.

With these various objects in view the invention consists in the novel features of construction, and in the manner of combining or arranging the same, all of which will be fully described hereinafter and pointed out in the appended claims.

In the drawings forming a part of this specification, Fig. 1 is a top plan view of an automobile bumper constructed in accordance with my invention; Fig. 2 is a rear elevation of the same; Fig. 3 is a detail sectional view on the line 3—3 of Fig. 2; and Fig. 4 is a detail sectional view on the line 4—4 of Fig. 2.

In constructing an automobile bumper in accordance with my invention, I employ a single rear bar 1 and preferably two front bars 2, said bars being of suitable resilient metal. The rear bar 1 is straight from end to end, as shown, whereas the opposite ends of the front bars 2 are curved rearwardly upon themselves, as shown at $2^a$, and their extreme ends $2^b$ are projected towards each other in parallel relation with the main portions of their respective bars.

In practice, suitable clamps 3 are attached to the rear bar 1, by means of which the bumper is connected to the automobile or other vehicle, suitable bolts 4 passing through the clamps and through the forwardly projecting bumper-supporting arms (not shown).

The adjacent opposed ends of the front and rear bars are arranged in alignment and connected together by means of complementary members 5, which may be castings, forgings or stampings, as preferred.

These complementary members not only serve to connect the ends together but also serve to position the ends of the bars with reference to these members and also with reference to each other.

With this object in view, the members 5 are formed with vertical ribs or flanges $5^a$ at the vertical central portions thereof and also with slightly inclined oppositely disposed ribs or flanges $5^b$, the ribs or flanges $5^a$ at the center being at the extreme outer edges of the members 5 while the ribs or flanges $5^b$ are along the inner edges and are spaced apart vertically to permit the cooperating end of the rear bar 1 to be inserted therebetween and between the complementary members, as most clearly shown in Figs. 1 and 3, and rivets 6 are employed for connecting the complementary members together and also for uniting the ends of the bar 1 thereto. It will be noted that the ribs or flanges $5^a$ extend toward each other and contact with each other when the members 5 are placed together and connected to the end of the rear bar and space said members apart for the reception of an end of the rear bar. Round holes are preferably punched through the central portions of the members and through the ends of the rear bars to receive the fastening rivets 6.

In the ends $2^b$ of the front bars 2, however, I preferably provide elongated openings $2^c$, through which bolts 7 are passed, nuts 8 being screwed upon the rear ends of said bolts; and, if desired, a lock washer 9 may be interposed between the rear member 5 and the nut.

The rear bar 1, it will be noted, does not extend entirely to the outer edges of the complementary clamping members as shown in Fig. 3; and the end of each outer or front bar 2 does not extend to the inner edges of said members, as most clearly shown in Fig. 4; and, by having the elongated openings in the ends of the front bars, no difficulty whatever will be had in assembling the ends of the front bars and connecting them to the complementary members, as shown in the drawings.

The ribs or flanges $5^a$ and $5^b$ are of such thickness that, when the members 5 are placed together, there will be just sufficient space between the main portions of said members to receive the ends of the rear bar 1 and the ends of the front bars 2; and the length of the ribs $5^b$ is such as to receive and retain therebetween the opposite edges of the rear bar. By means of this construction a perfectly snug fit will be had between the ends of the bars and the complementary clamping members, and the assemblage can be quickly and economically accomplished; and, when once made, the bumper as a whole will be strong, durable and not at all likely to become loose or disjointed while serving its usual functions.

Having thus described my invention, what I claim is:

1. An automobile bumper comprising front and rear bars, and complementary members at each end of the said bumper, said members being connected together and to the ends of the said bars at each end of the bumper, the said members being provided with spacing ribs or flanges adapted to contact when the said members are so connected to the said bars.

2. An automobile bumper comprising a rear bar and a plurality of front bars, and complementary members at each end of the said bumper and connected together and to the said bars at each end of the bumper, said members having spacing ribs or flanges which contact with each other adjacent the ends of said front and rear bars.

3. An automobile bumper comprising a rear bar and front bars, the ends of said front bars being curved rearwardly and towards each other, and complementary members at each end of the said bumper and connected together and to the said bars at each end of the bumper, said members having contacting spacing ribs or flanges between the ends of the front bars and also contacting spacing ribs or flanges upon opposite sides of the rear bar.

4. An automobile bumper comprising a straight rear bar and a plurality of front bars, the ends of which are bent rearwardly and then towards each other, complementary members connected to the ends of said bars and maintaining them in alignment and in spaced relation to one another, said complementary members having contacting spacing ribs at one edge at the central portion thereof and contacting spacing ribs or flanges at the opposite edge thereof, said last named ribs or flanges being spaced apart to permit the placement of the end of the rear bar therebetween.

5. An automobile bumper comprising a straight rear bar and a plurality of front bars having their ends curved rearwardly and towards each other, and complementary members for holding corresponding ends of the said bars in alignment with each other, the ends of the front bars having elongated openings, and means for connecting the complementary members and the ends of the bars together.

6. An automobile bumper comprising a rear or auxiliary bar and a pair of front or impact bars, the ends of the front or impact bars being vertically spaced and the rear or auxiliary bar having an end vertically spaced from the corresponding ends of the front or impact bars, and an end connection uniting such corresponding ends of the said bars in such spaced relationship.

7. An automobile bumper comprising a pair of vertically spaced front or impact bars and a rear or auxiliary bar, the front or impact bars having vertically spaced ends and the rear or auxiliary bar having ends spaced vertically from the corresponding ends of the first mentioned bars, and end connections uniting proximate ends of the said bars in such spaced relationship.

8. An automobile bumper comprising a rear or auxiliary bar and a pair of front or impact bars, the ends of the front or impact bars being vertically spaced and the rear or auxiliary bar having the central portion of each end spaced vertically from the corresponding ends of the front or impact bars, and end connections uniting such corresponding ends of the said bars in such spaced relation.

9. An automobile bumper comprising a rear or auxiliary bar and a pair of front or impact bars, the ends of the front or impact bars being vertically spaced and the rear or auxiliary bar having the central portion of each end spaced vertically from the corresponding ends of the front or impact bars, and end connections each comprising front and rear members connected together and providing vertically spaced seats for the cooperating ends of the front or impact bars, and means securing the ends of said bars to said end connections.

10. An automobile bumper comprising a rear or auxiliary bar and a pair of front or impact bars, the ends of the front or impact bars being vertically spaced and the rear or auxiliary bar having the central portion of each end spaced vertically from the corresponding ends of the front or impact bars, end connections comprising each a pair of members connected together and providing vertically spaced seats for the reception of the corresponding ends of the front or impact bars, and bolts securing the ends of said bars to said connections.

11. An automobile bumper comprising a rear or auxiliary bar and a pair of front or impact bars, the ends of the front or impact bars being vertically spaced and the rear or auxiliary bar having ends interposed between the ends of the front or impact bars, and end connections uniting the ends of the said bars in such spaced relation and having vertically spaced seats for the ends of the front or impact bars.

12. An automobile bumper comprising a pair of front or impact bars each having its ends bent rearwardly and toward each other, the corresponding ends of said bars being vertically spaced, and a rear or auxiliary bar having its ends interposed between the corresponding ends of the first-mentioned bars, and end connections for uniting corresponding ends of the three bars, each connection having an upper and a lower seat for the reception of the adjacent ends of the front or impact bars and an intermediate seat for the reception of the corresponding end of the rear or auxiliary bar.

13. An automobile bumper comprising a pair of front or impact bars each having its ends bent rearwardly and toward each other, the corresponding ends of said bars being vertically spaced, and a rear or auxiliary bar having its ends interposed between the corresponding ends of the first-mentioned bars, and end connections for uniting corresponding ends of the three bars, each connection comprising a pair of complementary members having upper and lower flanges for the cooperating ends of the front or impact bars and an intermediate flange for the end of the rear or auxiliary bar, and means for securing said members together and to the ends of said bars.

14. An automobile bumper comprising a pair of front or impact bars each having its ends curved rearwardly and toward each other and a rear or auxiliary bar having its ends interposed between the ends of the first-mentioned bars, and end connections for uniting corresponding ends of said bars, each connection comprising a pair of complementary members receiving therebetween corresponding ends of said bars, one or more of said bars having each an elongated opening through the end portion thereof, means extending through such opening or openings and said members for securing the appropriate bar or bars thereto, and means connecting the cooperating ends of the other bar or bars to said members.

15. An automobile bumper comprising a pair of vertically spaced front or impact bars and a rear or auxiliary bar, the front or impact bars having vertically spaced ends and the rear or auxiliary bar having an end vertically spaced from the corresponding ends of the front or impact bars, an end connection receiving such bar ends, and means connecting the ends of the bars, so received, to said connection.

16. An automobile bumper comprising a pair of vertically spaced front or impact bars and a rear or auxiliary bar, the front or impact bars having vertically spaced ends and the rear or auxiliary bar having an end interposed between corresponding ends of the front or impact bars, an end connection receiving such bar ends, and means connecting the end of each bar, so received, to said connection.

17. An automobile bumper comprising a pair of vertically spaced front or impact bars and a rear or auxiliary bar, the front or impact bars having vertically spaced ends and the rear or auxiliary bar having an end interposed between corresponding ends of the front or impact bars, an end connection receiving such bar ends, and means extending through the end of each bar, so received, and the front and rear of said connection and securing such bar ends to said connection.

In testimony whereof, I hereunto affix my signature.

CHRISTIAN GIRL.